(12) United States Patent
Katsuma

(10) Patent No.: US 8,477,421 B2
(45) Date of Patent: Jul. 2, 2013

(54) SCREEN

(75) Inventor: Ryoji Katsuma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/535,057

(22) Filed: Jun. 27, 2012

(65) Prior Publication Data

US 2013/0003174 A1 Jan. 3, 2013

(30) Foreign Application Priority Data

Jun. 28, 2011 (JP) ................................. 2011-143026

(51) Int. Cl.
*G03B 21/56* (2006.01)
*G03B 21/60* (2006.01)

(52) U.S. Cl.
USPC .......................................... 359/449; 359/459

(58) Field of Classification Search
USPC .................... 359/449, 459, 443, 457
See application file for complete search history.

(56) References Cited

U.S. PATENT DOCUMENTS

| | | | | |
|---|---|---|---|---|
| 3,598,470 A * | 8/1971 | Vetter | ................... | 359/455 |
| 7,826,135 B2 * | 11/2010 | Destain et al. | ............... | 359/449 |
| 8,169,700 B2 * | 5/2012 | Katsuma et al. | ............... | 359/459 |
| 2005/0068620 A1 * | 3/2005 | Umeya | ........................ | 359/459 |
| 2010/0092724 A1 | 4/2010 | Shiroya et al. | | |
| 2012/0229895 A1 * | 9/2012 | Shinbo et al. | ................. | 359/448 |

FOREIGN PATENT DOCUMENTS

| | | |
|---|---|---|
| JP | 2010-96883 | 4/2010 |
| JP | 2011-095541 | 5/2011 |

* cited by examiner

*Primary Examiner* — Christopher Mahoney
(74) *Attorney, Agent, or Firm* — Workman Nydegger

(57) ABSTRACT

A screen allows an image according to light incident in an oblique direction from a predetermined light exiting position to be displayed. The screen includes a screen body having a reflection surface with a plurality of lens elements formed thereon, each of the lens elements reflecting the light incident thereon, a first layer (substrate) disposed on the side of the reflection surface on which the light is incident, and a second layer (air layer) interposed between the screen body and the first layer. The first layer has a refractive index greater than the refractive index of the second layer. The first layer has an angle changing portion formed in at least part of a region through which the light incident thereon passes, the angle changing portion so formed that the thickness thereof continuously increases with distance from the light exiting position.

10 Claims, 12 Drawing Sheets

SCREEN

BACKGROUND

1. Technical Field

The present invention relates to a screen on which an image is displayed, and particularly to a screen on which an image according to projected light incident in an oblique direction from a projector or any other image projection apparatus is displayed.

2. Related Art

There are screens that are known to display an image projected from a projector or any other image projection apparatus. One of the screens of this type can reflect light incident from the projector toward a viewing position in front of the screen even when the distance between the projector and the screen is small (see JP-A-2010-96883, for example).

The screen described in JP-A-2010-96883 has a plurality of concave lens elements arranged over a light incident surface, and a light reflection layer is formed on the surface of each of the lens elements. Part of the light incident on the light reflection layer is reflected toward the viewing position and visually recognized as an image in the viewing position.

When projected light is incident in an oblique direction on a screen, such as the one described in JP-A-2010-96883, and a normal to the incident surface of the screen and the optical path of the projected light incident on the incident surface form a relatively small angle, a light flux incident on each of the lens elements has a wide width. When a light flux has a wide width, light of a small degree of concentration is incident on a wide area of each of the lens elements described above. In this case, since only a small amount of light is incident on an effective reflection region that is part of the light reflection layer described above and effectively reflects light incident thereon toward the viewing position, a displayed image is disadvantageously not very bright.

SUMMARY

An advantage of some aspects of the invention is to provide a screen capable of increasing the brightness of a displayed image.

An aspect of the invention is directed to a screen on which an image according to light incident in an oblique direction from a predetermined light exiting position is displayed. The screen includes a screen body having a reflection surface with a plurality of lens elements formed thereon, each of the lens elements reflecting the light incident thereon, a first layer disposed on the side of the reflection surface on which the light is incident, and a second layer interposed between the screen body and the first layer. The first layer has a refractive index greater than the refractive index of the second layer, and the first layer has an angle changing portion formed in at least part of a region through which the light incident thereon passes, the angle changing portion so formed that the thickness thereof continuously increases with distance from the light exiting position.

Each of the lens elements formed on the reflection surface is, for example, a lens element having a concavely curved surface. A normal to the reflection surface in the following description means a normal to a virtual flat plane obtained by averaging the protrusions and recesses formed by the lens elements on the reflection surface.

According to the aspect of the invention, light having exited from the predetermined light exiting position is incident on the first layer, passes through the first layer, and is incident on the screen body via the second layer having a refractive index smaller than that of the first layer. The angle changing portion is formed in the region of the first layer through which the light passes. Since the angle changing portion is so formed that the thickness thereof continuously increases with distance from the light exiting position, one of the surfaces of the angle changing portion on the light exiting position side and on the screen body side is inclined to the other. Light passing through the thus configured angle changing portion is refracted at the surface on the light exiting position side and at the surface on the screen body side, and the inclined surface changes the direction in which the light travels toward the screen body in such a way that the light reaches a position further apart from the light exiting position. The angle of incidence of the light incident on the reflection surface of the screen body (intersecting angle between the normal to the virtual flat plane described above and the optical path of the light incident on the reflection surface) can be increased as compared with a case where no first or second layer is present. The configuration described above allows the width of a light flux incident on the reflection surface to decrease as compared with a case where no first or second layer is present, whereby the degree of concentration of the light flux can be increased. As a result, the amount of light incident on an effective reflection region that forms each of the lens elements and reflects the light flux to a predetermined position (viewing position, for example) can be increased, whereby the brightness of an image displayed on the screen can be improved.

In screen according to the aspect of the invention, it is preferable that the angle changing portion has a flat first surface located on the light exiting position side, a flat second surface located on the screen body side, and a third surface that extends along a plane connecting the ends of the first surface and the second surface that face away from the light exiting position. It is also preferable that the first layer has a configuration in which the angle changing portion is formed as a single unit shape at a plurality of locations; the first surfaces of the angle changing portions form a surface of the first layer on the light exiting position side; and the second surfaces of the angle changing portions form a surface of the first layer on the screen body side.

According to this configuration, at least one of the surfaces of the first layer, the surface on the predetermined light exiting position side and the surface on the screen body side, has a sawtooth cross-sectional shape. As a result, the thickness of the first layer (dimension in the direction in which light incident on the first layer travels) can be smaller than in a case where the first layer is formed of a single angle changing portion (a case where the surfaces of the first layer on the predetermined light exiting position side and the screen body side are formed of the first and second surfaces of a single angle changing portion, respectively), whereby the screen will not unnecessarily be thick.

In the screen described above, it is preferable that the angle changing portions have concentric perfect circular shapes around a first reference point set on a front surface of the first layer, a rear surface of the first layer, or an extension plane of the front or rear surface and are arranged along a radial direction from the first reference point.

According to this configuration, when the light exiting position described above is set somewhere along a direction passing through the first reference point and extending along a normal to the reflection surface, a light ray having exited from the light exiting position is incident perpendicularly on the tangential line of the arc of the angle changing portion on which the light ray is incident. The configuration described above maximizes the angle of incidence of light passing through each of the angle changing portions and incident on the corresponding lens element of the screen body, whereby the amount of light incident on each of the effective reflection regions can be reliably increased and the brightness of a displayed image can further be improved.

In the screen described above, it is preferable that the lens elements are arranged along substantially arcuate reference lines around a second reference point set on the reflection surface or an extension plane of the reflection surface.

The position of the first reference point and the position of the second reference point may or may not coincide with each other when the screen is viewed from the front (when the screen is viewed from the side where the light exiting position is present). Further, each of the reference lines may follow an arc that partially forms a perfect circle or an ellipse or an arc obtained by adding a straight or curved line to the arc that partially forms a perfect circle or an ellipse.

According to this configuration, light can be more readily incident on the effective reflection regions, which can reflect light incident on the lens elements toward a predetermined position (a position from which a displayed image is viewed, for example), than in a case where the screen body has a plurality of lens elements arranged along linear reference lines parallel to one another, whereby the brightness of a displayed image can be improved.

In the screen described above, it is preferable that the period at which the angle changing portions are arranged differs from the period at which the lens elements are arranged, and the dimension of each of the lens elements in a radial direction from the second reference point is not equal to an integral multiple of the dimension of the angle changing portion corresponding to the lens element in the radial direction from the first reference point.

Among the light rays having exited through the angle changing portions toward the screen body, light rays having exited through the third surfaces are unlikely to be incident on the effective reflection regions described above in the lens elements. In other words, the light rays having exited through the third surfaces are unlikely to form a recognizable image. As a result, in a case where the position of the first reference point coincides with the position of the second reference point with the screen viewed from the front, and when the period at which the angle changing portions are arranged is equal to the period at which the lens elements are arranged and the dimension of each of the lens elements in the radial direction from the second reference point is equal to an integral multiple of the dimension of the corresponding angle changing portion in the radial direction from the first reference point, the light rays having exited through the third surfaces are disadvantageously incident on fixed portions of the lens elements, resulting in brightness unevenness in a displayed image.

In contrast, in the screen described above according to the aspect of the invention, the period at which the angle changing portions are arranged differs from the period at which the lens elements are arranged, and the dimension of each of the lens elements in the radial direction from the second reference point is not equal to an integral multiple of the dimension of the corresponding angle changing portion in the radial direction from the first reference point. In this case, the light rays having exited through the third surfaces can be incident on various portions of the lens elements even when the position of the first reference point coincides with the position of the second reference point with the screen viewed from the front, whereby the light reflected off the entire screen can be made uniform. No brightness unevenness will therefore occur in a displayed image.

In the screen according to the aspect of the invention, it is preferable that the surface of the first layer on the light exiting position side or the surface of the first layer on the screen body side has an antireflection layer.

The antireflection layer can, for example, be a film or a coating that reduces the amount of surface reflection to improve transmittance.

Since the screen described above has an antireflection layer formed at least on one of the surfaces described above, the amount of light incident on the first layer can be increased, whereby the brightness of a displayed image can further be improved.

In the screen according to the aspect of the invention, it is preferable that the surface of the first layer on the light exiting position side is a flat surface.

Projectors and screens are frequently used in presentations and other situations. In the presentations, a displayed image is pointed, for example, with a pointing stick or characters and other information are written on the image in some cases. These operations are not readily performed if the surface of the screen has irregularities.

In contrast, in the screen according to the aspect of the invention, since the surface of the first layer on the side where the predetermined light exiting position is present is a flat surface, the operations described above can be readily performed, whereby the versatility of the screen can be improved. The effect described above is more advantageous in an interactive whiteboard system in which the path of an electronic pen moving over a substrate is acquired and a line according to the path is drawn on a displayed image.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to the drawings.

Function of Screen

Figure 1:
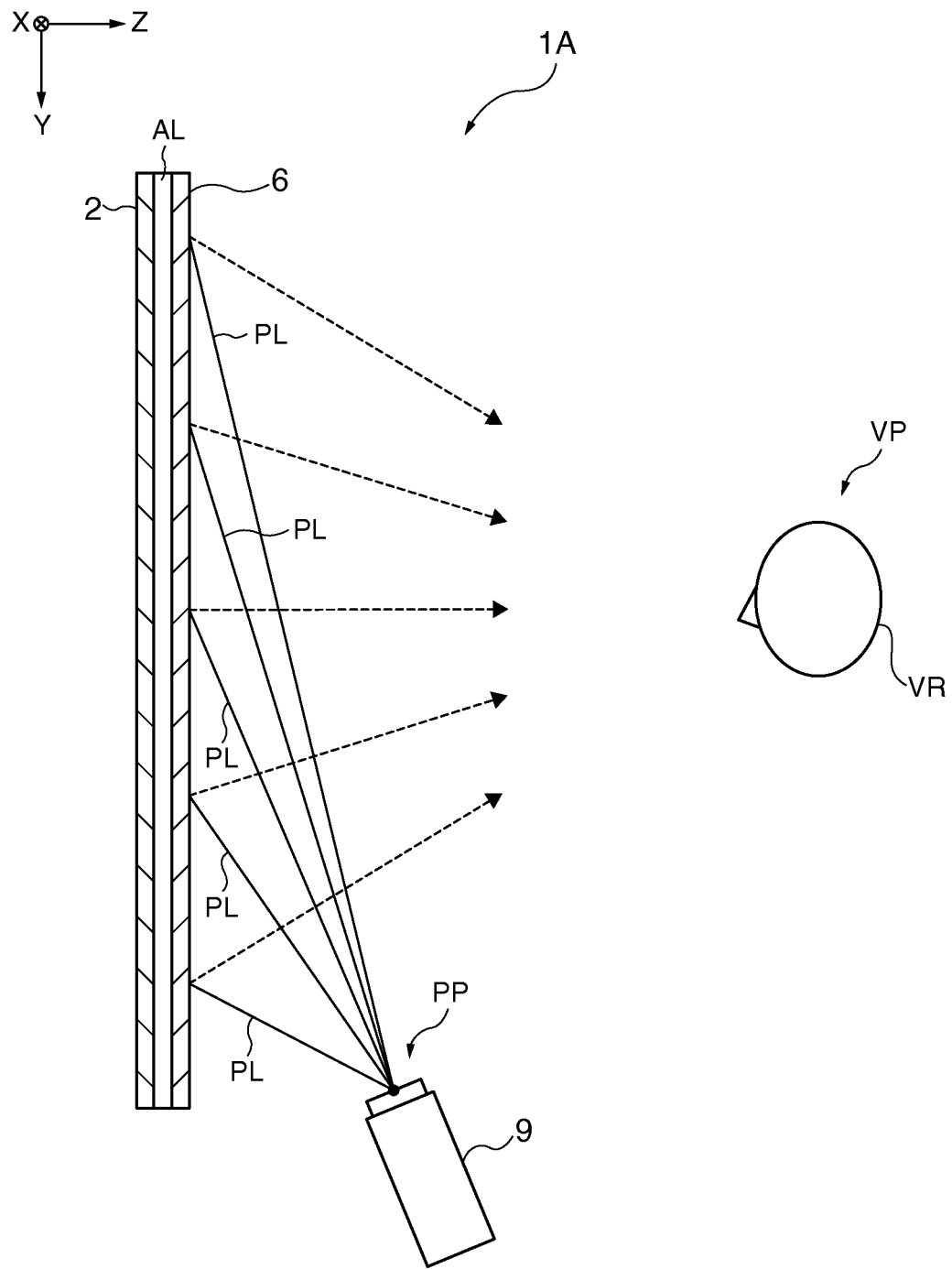
FIG. 1 is a side view showing how a screen according to a first embodiment of the invention is used.

FIG. 1 is a side view showing how a screen 1A according to the present embodiment is used.

In the following description, it is assumed for convenience of description that a front side of the screen 1A is where a projector 9 is installed and a rear side of the screen 1A is opposite to the front side. It is further assumed that an X direction is the rightward direction defined when the screen 1A is viewed from the front, a Y direction is the vertical direction (direction in which self weight is applied), and a Z direction is the direction away from the screen 1A along a normal to the front side thereof.

The screen 1A according to the present embodiment is a reflective screen that reflects projected light PL incident in an oblique direction from the projector 9 located in a lower position in front of the screen 1A (in detail, light exiting position PP where projection optical unit is positioned) toward a viewer in front of the screen 1A and displays an image formed by the projected light, as shown in FIG. 1. The projected light PL incident on the screen 1A is reflected toward a viewing position VP set somewhere along a normal (that is, line in Z direction) to the center of the front surface of the screen 1A. A viewer VR in the viewing position VP can thus view the displayed image.

A description will be made of the configuration of the projector 9, which projects the projected light PL, which forms an image on the screen 1A.

Although not illustrated in detail, the projector 9 includes alight source unit, a color separation optical unit, a light modulation unit, a light combining optical unit, and a projection optical unit and is so disposed that the central axis of the projected light PL passes through the center CP of the screen 1A. In the projector 9, the color separation optical unit separates a light flux having exited from the light source unit into red (R), green (G), and blue (B) color light fluxes, and the light modulation unit including three liquid crystal panels modulates the color light fluxes in accordance with image information. The light combining optical unit then combines the modulated color light fluxes, and the projection optical unit projects the combined light (image light).

The thus configured projector 9 includes a retardation plate (λ/4 plate) that converts the light modulated by the light modulation unit (image light) into circularly polarized light. The light projected from the projection optical unit is therefore circularly polarized light. The reason for this is to prevent the luminance values of the red (R), green (G), and blue (B) color light fluxes that form the projected light from changing differently when the projected light passes through a substrate 6, which will be described later, of the screen 1A or the tint of the projected light from changing. The rotation directions of the circularly polarized color light fluxes preferably agree with one another.

Schematic Configuration of Screen

The screen 1A includes a screen body 2, a light-transmissive substrate 6 located in front of the screen body 2, and an air layer AL interposed between the screen body 2 and the substrate 6. Among them, the substrate 6 corresponds to a first layer in the appended claims, and the air layer AL corresponds to a second layer in the appended claims.

Configuration of Screen Body

Figure 2:
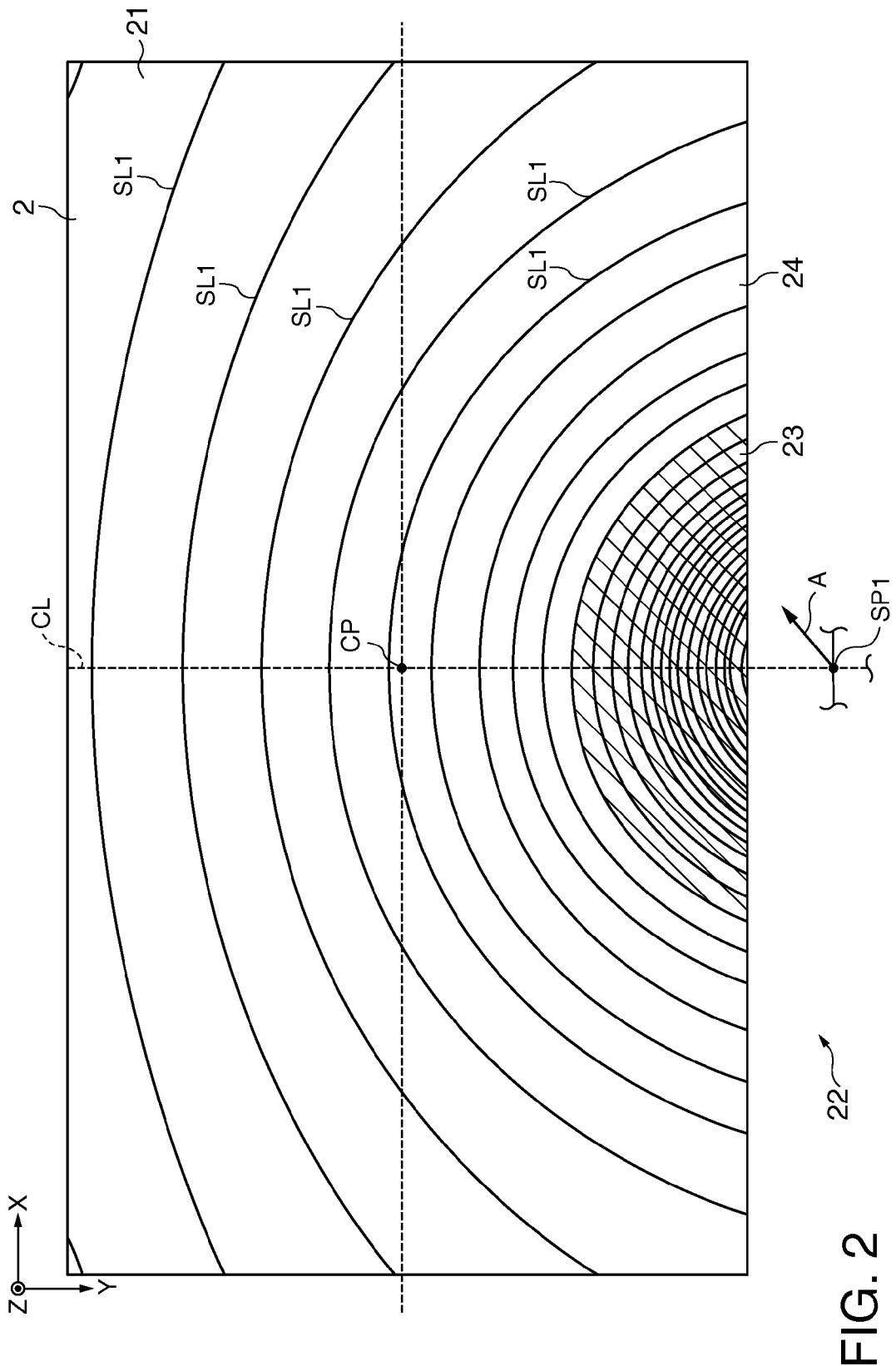
FIG. 2 is a front view showing a screen body in the first embodiment.

FIG. 2 is a front view showing the screen body 2. Reference lines SL1 shown in FIG. 2 are representative ones, and the reference lines SL1 are, in practice, set at narrower intervals. Further, reference characters of the reference lines SL1 shown in FIG. 2 are also partially omitted.

The screen body 2 reflects the projected light PL incident thereon after having passed through the substrate 6 and the air layer AL. The projected light PL reflected off the screen body 2 passes through the air layer AL and the substrate 6 again and exits out of them toward the viewing position VP. The screen body 2 has a horizontally elongated, substantially rectangular shape when viewed from the front as shown in FIG. 2, and a front surface 21 of the screen body 2 is not only an incident surface on which the projected light PL is incident via the substrate 6 and the air layer AL but also a reflection surface that reflects the projected light PL. That is, the front surface 21 corresponds to a reflection surface in the appended claims.

The front surface 21 has a region 23 (hatched portion in FIG. 2) within a predetermined range around a reference point SP1 set in advance in an extension plane 22 of the front surface 21 and a region 24 outside the region 23. Lens elements 3 (see FIGS. 3 and 4), which will be described later, are arranged in each of the regions 23 and 24. The reference point SP1 corresponds to a second reference point in the appended claims and in the present embodiment is set in the position along a central line CL, which is the vertical line passing through the center CP, where the reference point SP1 coincides with the light exiting position PP when the screen 1A is viewed from the front.

Lens elements 3A, each of which is formed of a first concave portion 4 (see FIG. 3), are disposed in the region 23 along the reference lines SL1, which are arcuate virtual lines that partially form concentric circles (including circles and ellipses) around the reference point SP1. Lens elements 3B, each of which is formed of a first concave portion 4 and a second concave portion 5 formed adjacent to the first concave portion 4 on the side close to the reference point SP1 (see FIG. 4), are disposed along the reference lines SL1 in the region 24. The reference lines SL1 correspond to reference lines in the appended claims.

The distance between the reference lines SL1 set in the regions 23 and 24 is designed to increase with distance from the reference point SP1, and the distance between the centers of the lens elements 3A, 3B therefore increases with distance from the reference point SP1. The dimensions of the lens elements 3A and 3B in the radial direction from the reference point SP1 (in A direction in FIGS. 3 and 4) are also designed to increase with distance from the reference point SP1. Further, the distances between the lens elements 3A, 3B along the reference lines SL1 are designed to be maximized along the radial direction from the reference point SP1 that is inclined to the central line CL by an angle of 45 degrees and decrease as the angle approaches 0 degrees from 45 degrees and as the angle approaches 90 degrees from 45 degrees.

According to the arrangement pattern described above, reference lines SL1 close to the reference point SP1 have arcuate shapes that partially form vertically elongated ellipses each having a major axis along the Y direction, and the reference lines SL1 are so changed with distance from the reference point SP1 that they follow arcuate shapes that partially form horizontally elongated ellipses each having a major axis along the X direction, as shown in FIG. 2. A reference line SL1 set apart from the reference point SP1 by a predetermined dimension therefore follows an arcuate shape that partially forms a perfect circle.

In the following description and illustration, the direction radially extending from the reference point SP1 along the front surface 21 and the extension plane 22 (radial direction) is called an A direction.

Configuration of Lens Element

Figure 3:
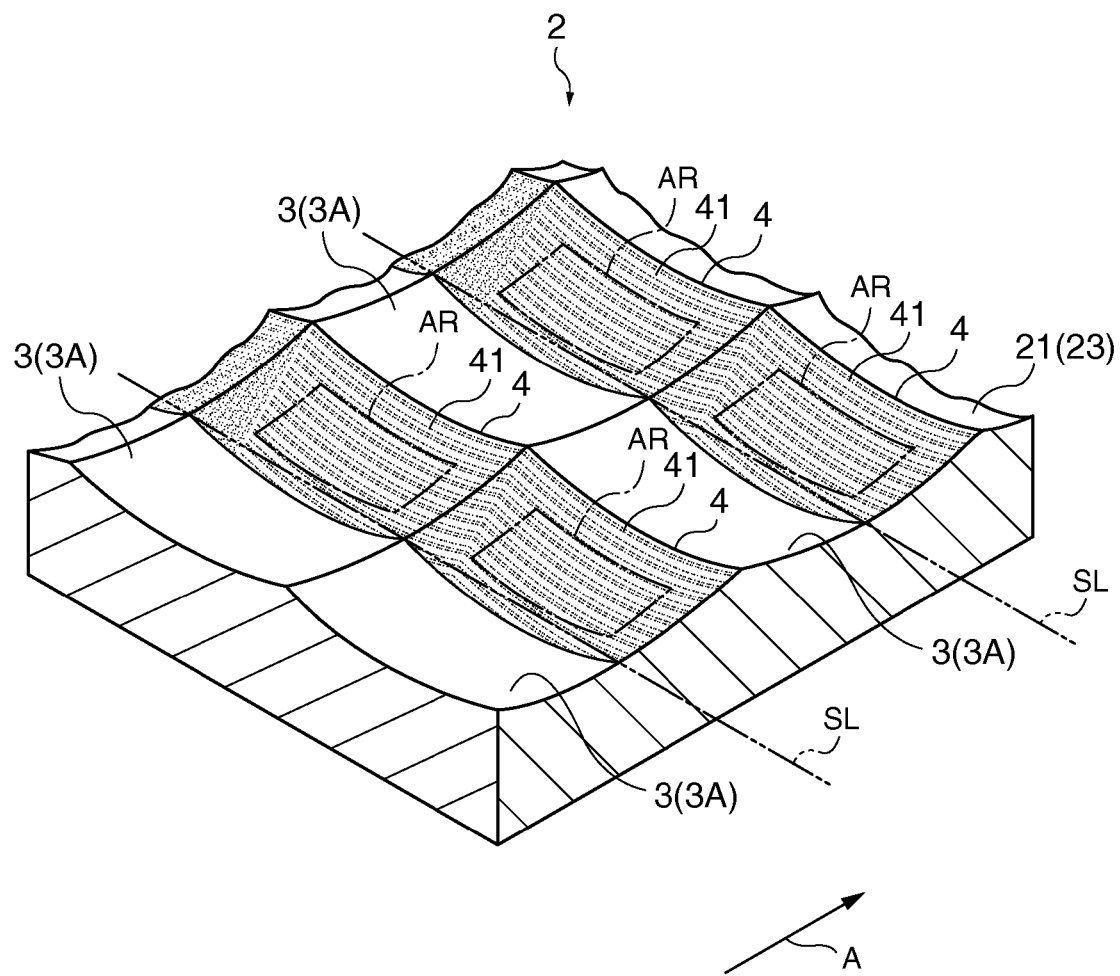
FIG. 3 is a perspective view showing lens elements in the first embodiment.

FIG. 3 is a perspective view showing some of the lens elements 3A.

The lens elements 3A, each of which is formed of the first concave portion 4, are arranged along part of the reference lines SL1 described above, whereby a plurality of lens trains each of which is formed of a plurality of lens elements 3A along the reference lines SL1 are formed in the region 23.

Each of the lens elements 3A has a concavely curved surface of predetermined curvature on which the projected light PL is incident, and a reflection layer 41 that reflects light incident thereon is formed on the concavely curved surface, as shown in FIG. 3. The region over which the reflection layer 41 is formed includes an effective reflection region AR that reflects the projected light PL incident thereon and guides the light to the viewing position VP described above. The reflection layer 41 is formed, for example, by applying highly reflective white paint in a spraying process or depositing aluminum or silver in an oblique evaporation process.

Figure 4:
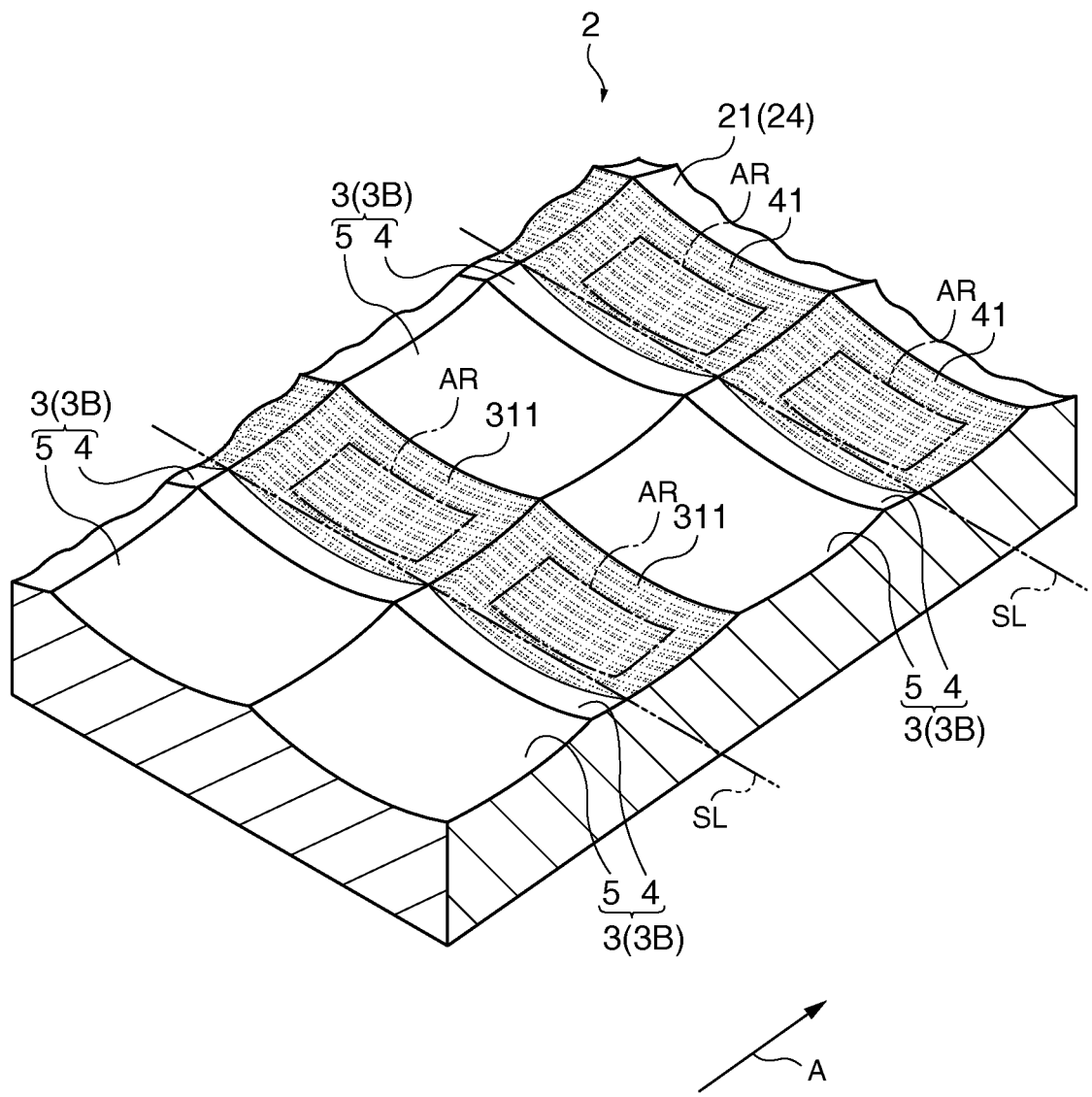
FIG. 4 is a perspective view showing other lens elements in the first embodiment.

FIG. 4 is a perspective view showing some of the lens elements 3B.

The lens elements 3B, each of which is formed of the first concave portion 4 and the second concave portion 5, are arranged along part of the reference lines SL1 described above, whereby a plurality of lens trains each of which is formed of a plurality of lens elements 3B along the reference lines SL1 are formed in the region 24.

The second concave portions 5 are formed adjacent to the first concave portions 4 in positions closer to the reference point SP1 than the first concave portions 4, as shown in FIG. 4. Each of the second concave portions 5 lowers the ridge between the second concave portion 5 and the first concave portion 4 adjacent thereto and located on the opposite side thereof to the reference point SP1, and the lowered ridge allows the projected light PL to be incident on the reflection layer (effective reflection region AR in detail).

Configuration of Substrate

Figure 5:
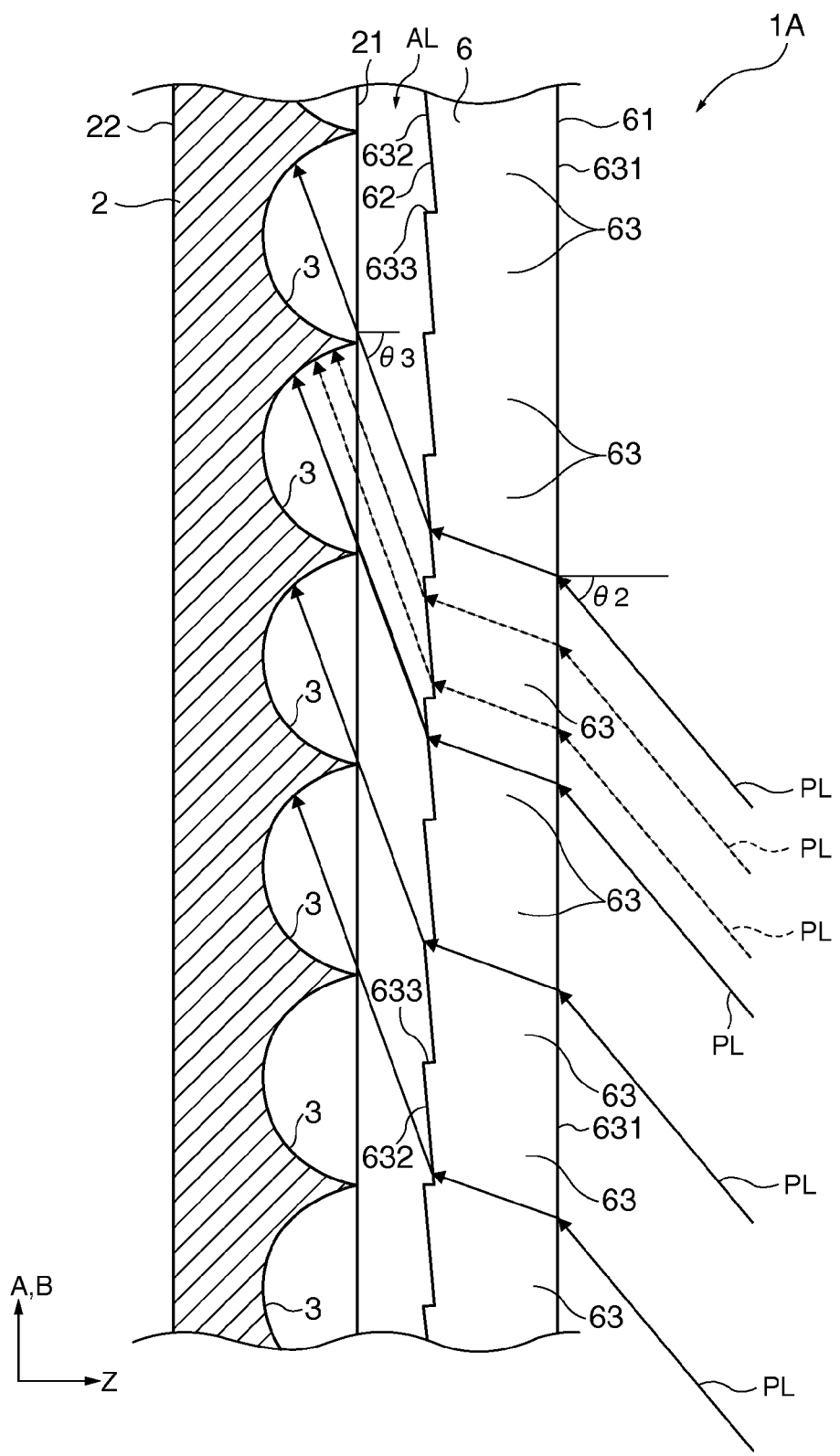
FIG. 5 is a cross-sectional view showing the screen in the first embodiment.

FIG. 5 is a longitudinal cross-sectional view (taken along vertical direction) of the screen 1A. FIG. 5 diagrammatically shows a cross section in the vicinity of the center of the screen 1A taken along a plane including the A direction described above, a B direction, and the Z direction. In FIG. 5, each of the lens elements 3 is schematically drawn in the form of a semicircle. Further, among projected light rays PL incident on a certain lens element 3, those incident on the effective reflection region AR are indicated by dotted arrows.

The substrate 6 is made, for example, of a light-transmissive resin (transparent vinyl chloride resin, for example) or glass, so formed that the horizontal and vertical dimensions (in X and Y directions) thereof is substantially the same as those of the screen body 2, and disposed on the front side of the screen body 2 with the interposed air layer AL having a predetermined thickness, as described above. The substrate 6 has a function of guiding the projected light PL incident from the projector 9 to the front surface 21, which is the reflection surface of the screen body 2, specifically, allowing the projected light PL to be incident on the front surface 21 with a greater angle of incidence of the projected light PL incident on the front surface 21 (a greater angle between a normal to the front surface 21 and the optical path of the projected light PL) than in a case where no substrate 6 is provided, as shown in FIG. 5. In other words, the substrate 6 has a function of increasing the degree of concentration of light incident on the effective reflection regions AR of the screen body 2. A normal used herein to the front surface 21, which has a plurality of concavely curved lens elements 3 formed thereon, means a normal to a virtual flat plane obtained by averaging the protrusions and recesses of the front surface 21.

The substrate 6 has a flat front surface 61 on which the projected light PL from the projector 9 is directly incident and a rear surface 62 which has a sawtooth cross-sectional shape and through which the projected light PL having been incident through the front surface 61 and having passed through the substrate 6 exits toward the screen body 2.

The rear surface 62 is also a light incident surface on which the light reflected off the front surface 21 is incident, and the front surface 61 is also a light exiting surface through which the projected light PL incident through the rear surface 62 exits. In the present embodiment, the front surface 61 is disposed to be substantially parallel to the front surface 21 (virtual flat plane described above in detail).

An antireflection layer is formed on each of the front surface 61 and the rear surface 62. The antireflection layer on the front surface 61 substantially prevents the projected light PL from the projector 9 from being scattered at the front surface 61, and the antireflection layer on the rear surface 62 guides the light incident from the screen body 2 into the substrate 6 in a preferable manner.

Configuration of Angle Changing Portion

Figure 6:
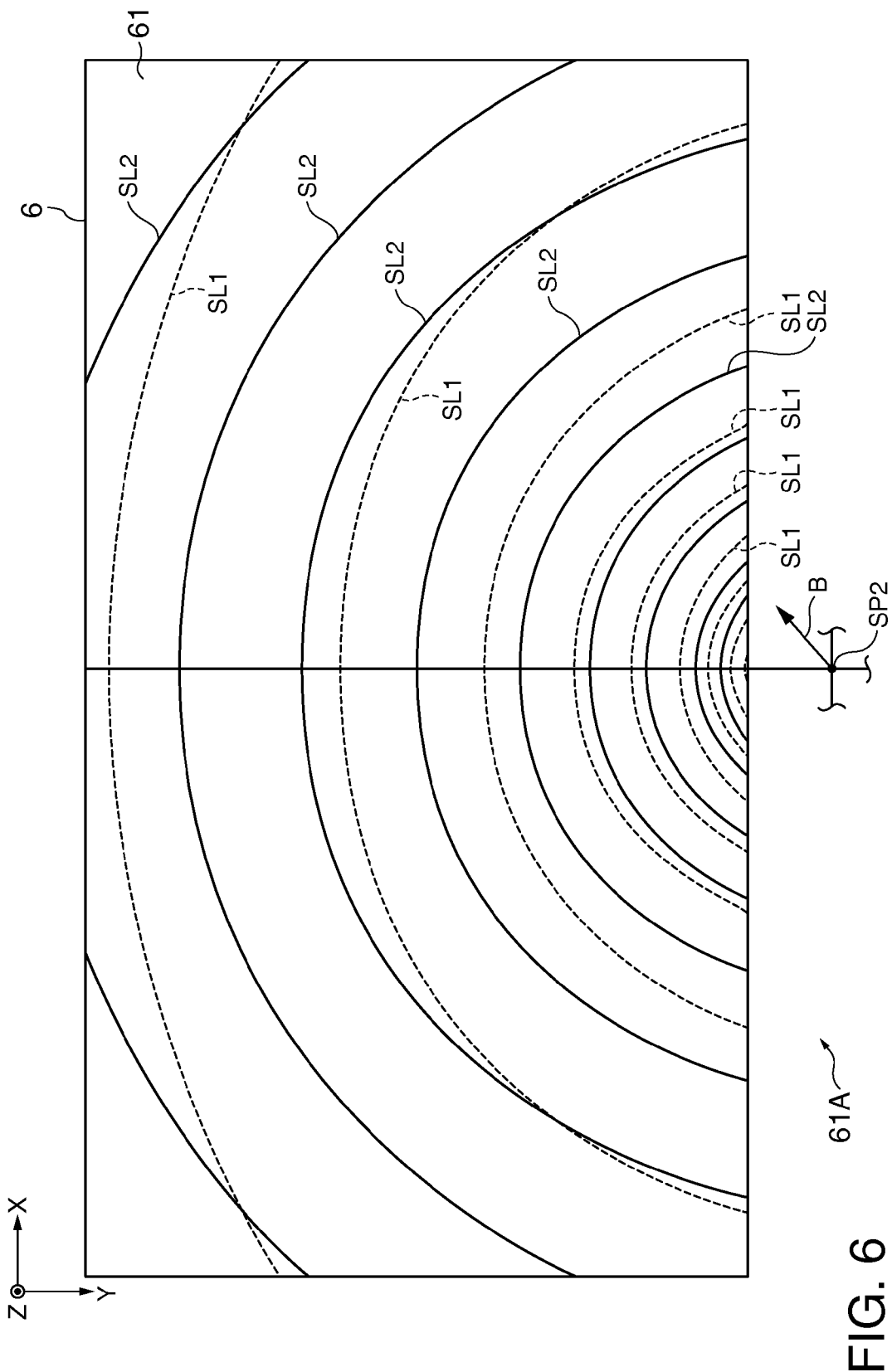
FIG. 6 is a front view showing a substrate in the first embodiment.

FIG. 6 shows reference lines SL2 for angle changing portions 63. In FIG. 6, solid lines represent the reference lines SL2 and dotted lines represent the reference lines SL1 described above. It is, however, noted that FIG. 6 does not show all the reference lines SL1 or SL2 but only shows representative ones. The reference lines SL1 and SL2 are, in practice, set at narrower intervals. Further, in FIG. 6, reference characters of the reference lines SL1 and SL2 shown in FIG. 6 are also partially omitted.

A plurality of angle changing portions 63, each of which has a single unit shape, are formed in the region of the substrate 6 on which the projected light PL is incident. Specifically, the angle changing portions 63 are formed along the plurality of reference lines SL2, which partially form concentric perfect circles around a reference point SP2 set in an extension plane 61A of the front surface 61, as shown in FIG. 6. The reference point SP2 corresponds to a first reference point in the appended claims.

That is, the angle changing portions 63 have concentric perfect circular shapes so formed that third surfaces 633, which will be described later, of the angle changing portions 63 extend along the reference lines SL2. Further, the period at which the angle changing portions 63 are arranged differs from the period at which the lens elements 3 are arranged, which will be described later in detail. The angle changing portions 63 are arranged adjacent to each other along a B direction. The B direction is the radial direction from the reference point SP2 along the front surface 61 and the extension plane 61A.

In the present embodiment, the reference point SP2 is so set that the position thereof coincides with the position of the reference point SP1 and the light exiting position PP when the screen 1A is viewed from the front but not necessarily set this way. From the viewpoint of the function of the substrate 6, the position of the reference point SP2 preferably coincides with the position of the light exiting position PP when the screen 1A is viewed from the front. The reason for this will be described later in detail.

Each of the angle changing portions 63 has a substantially regular trapezoidal cross-sectional shape (having two sides parallel to each other and perpendicular to one side that connects the two sides) and has a thickness (dimension in Z direction) that increases with distance from the light exiting position PP described above, as shown in FIG. 5. That is, the thickness of each of the angle changing portions 63 increases along the B direction.

Each of the angle changing portions 63 having the substantially regular trapezoidal cross-sectional shape has a first surface 631 that forms the one side described above, a second surface 632 that forms the opposite side of the one side, and a third surface 633 that extends along a plane connecting the ends of the first surface 631 and the second surface 632 that face away from the reference point SP2. The surface extending along a plane connecting the ends of the first surface 631 and the second surface 632 that face the reference point SP2 is only seen at the end surface of the substrate 6 on the side where the reference point SP2 is present (lower end surface) because the angle changing portions 63 are formed integrally with each other into the substrate 6.

The first surfaces 631 are flat and form the front surface 61.

Each of the third surfaces 633 connects the ends of the second surfaces 632 of angle changing portions 63 adjacent to each other in the B direction in the substrate 6.

The second surfaces 632 are flat and form, along with the third surfaces 633, the sawtooth rear surface 62. The second surfaces 632 are surfaces through which the projected light PL having passed through the angle changing portions 63 (substrate 6) exits toward the screen body 2 and on which the projected light PL reflected off the screen body 2 is incident.

Each of the thus configured second surfaces 632 extending in the B direction is inclined in the direction away from the first surface 631. In other words, each of the second surfaces 632 extending in the B direction is inclined toward the screen body 2.

Figure 7:
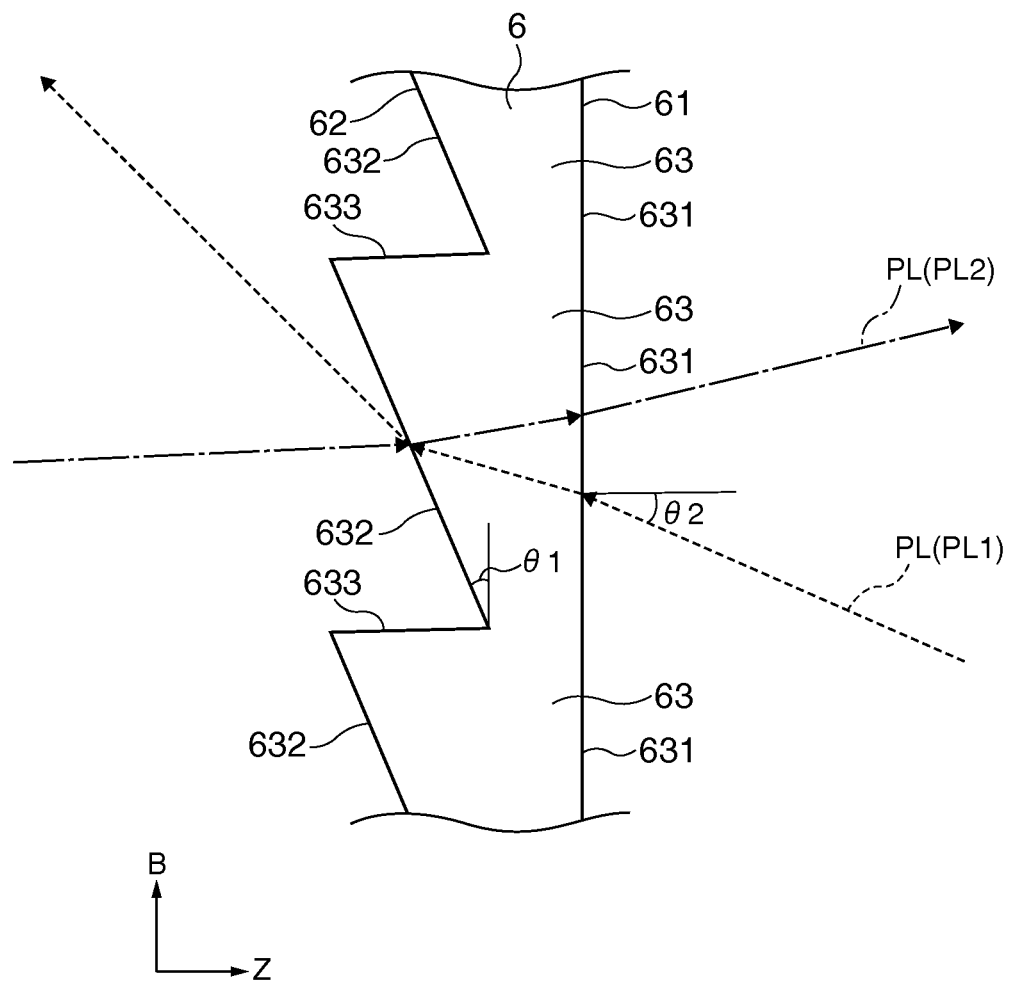
FIG. 7 is a cross-sectional view showing an angle changing portion located in the vicinity of the lower end of the screen in the first embodiment.
Figure 8:
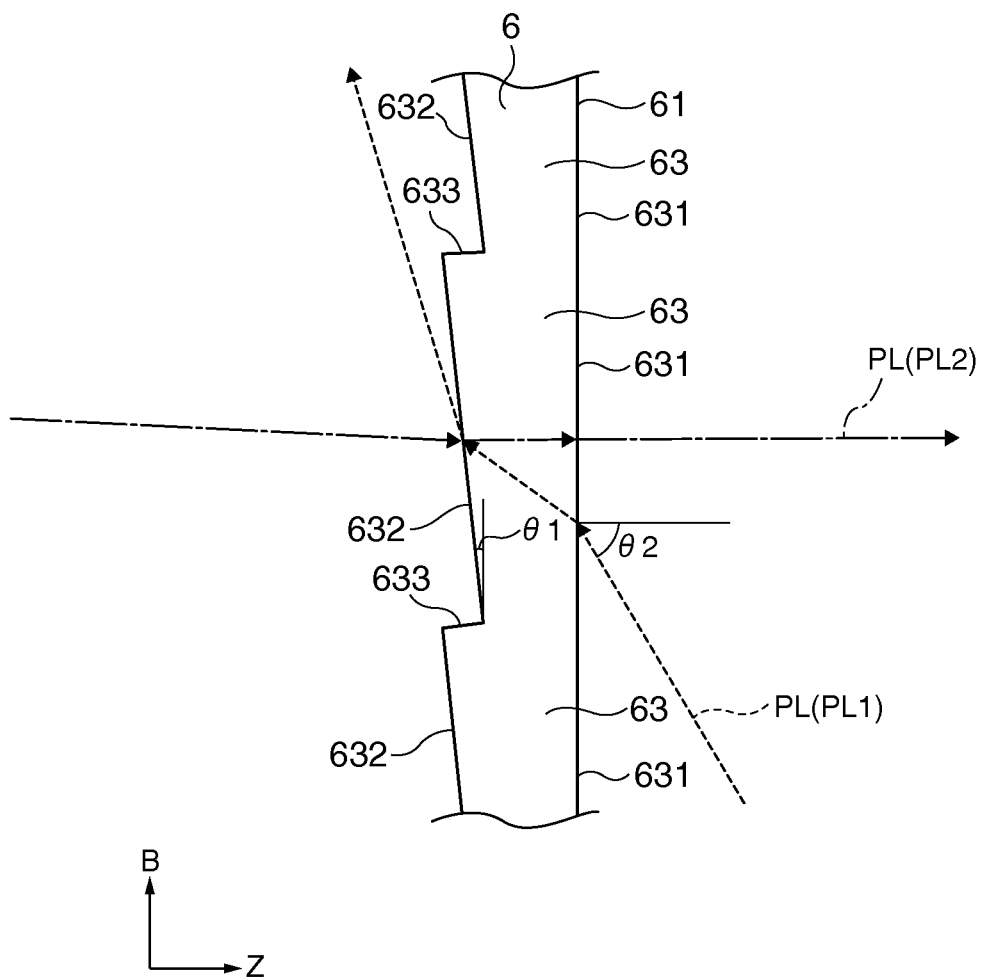
FIG. 8 is a cross-sectional view showing an angle changing portion located in the vicinity of the center of the screen in the first embodiment.
Figure 9:
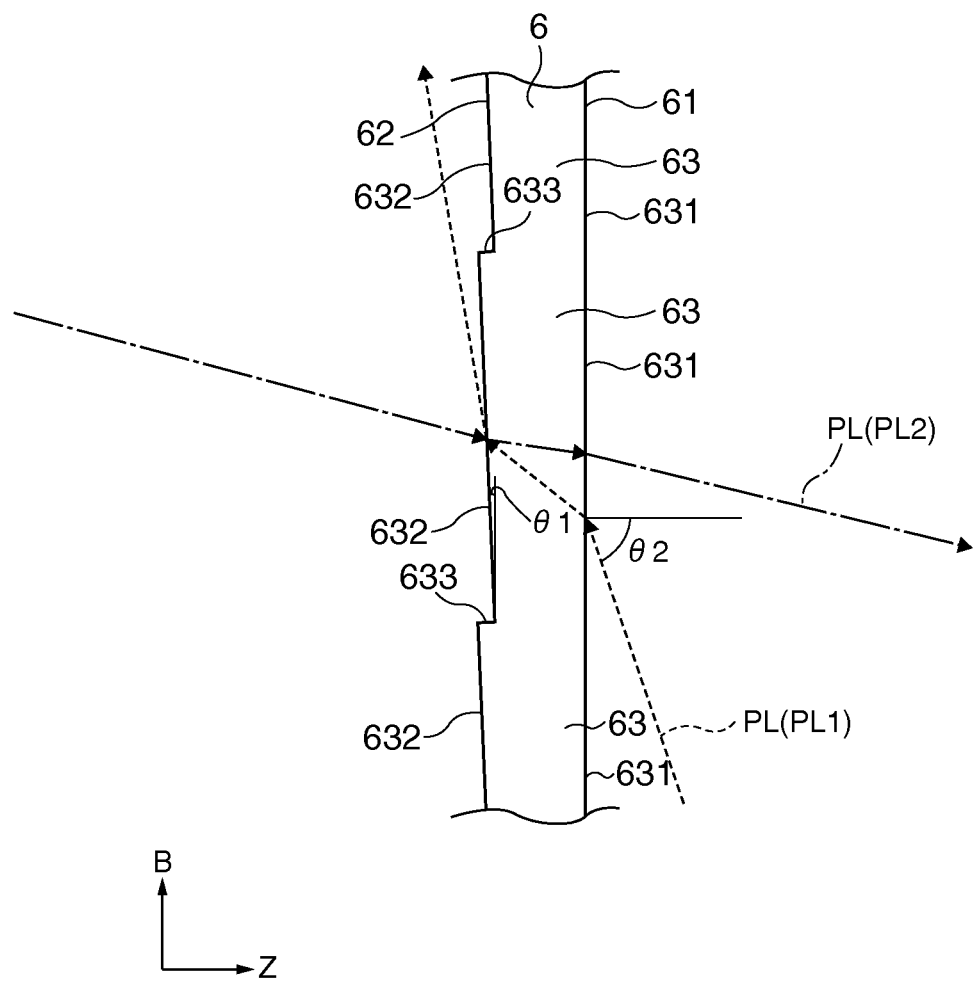
FIG. 9 is a cross-sectional view showing an angle changing portion located in the vicinity of the upper end of the screen in the first embodiment.

FIGS. 7 to 9 are cross-sectional views taken along the BZ plane and show an angle changing portion 63 close to the reference point SP2 of the screen 1A, an angle changing portion 63 in the vicinity of the center of the screen 1A, and an angle changing portion 63 far away from the reference point SP2 of the screen 1A, respectively. In FIGS. 7 to 9, dotted lines represent the optical path of the projected light PL incident from the projector 9, and the dashed lines represent the optical path of the projected light PL reflected off one of the effective reflection regions AR described above and directed toward the viewing position VP through the substrate 6.

As shown in FIGS. 7 to 9, the inclination angle $\theta 1$ of the second surface 632 (intersecting angle $\theta 1$ between the second surface 632 and a plane parallel to the first surface 631) is set in accordance with the position where the angle changing portion 63 is formed. That is, the inclination angle $\theta 1$ is designed to decrease as the position where the angle changing portion 63 is formed advances in the B direction.

Specifically, the inclination angle $\theta 1$ of the second surface 632 of an angle changing portion 63 formed in the vicinity of the center of the substrate 6 is smaller than the inclination angle $\theta 1$ of the second surface 632 of an angle changing portion 63 formed in a position closer to the reference point SP2 (in a position closer to the light exiting position PP) than the angle changing portion 63 formed in the vicinity of the center, as shown in FIGS. 7 and 8. Further, the inclination angle $\theta 1$ of the second surface 632 of an angle changing portion 63 formed in a position farther from the reference point SP2 (in a position farther from the light exiting position PP) than an angle changing portion 63 formed in the vicinity of the center is smaller than the inclination angle $\theta 1$ of the second surface 632 of the angle changing portion 63 formed in the vicinity of the center, as shown in FIGS. 8 and 9.

In the present embodiment, the inclination angle $\theta 1$ of the second surface 632 of an angle changing portion 63 formed in the vicinity of the center of the substrate 6 (angle changing portion 63 shown in FIG. 8) is set at about 5 degrees. The inclination angle $\theta 1$ of the second surface 632 of an angle changing portion 63 in a position close to the reference point SP2 (angle changing portion 63 shown in FIG. 7) is set at about 22 degrees, and the inclination angle $\theta 1$ of the second surface 632 of an angle changing portion 63 in a position far away from the reference point SP2 (angle changing portion 63 shown in FIG. 9) is set at about 3 degrees. These inclination angles $\theta 1$ may, however, be set at any values as appropriate.

The inclination angles $\theta 1$ are set as described above because the angle of incidence of the projected light PL from the projector 9 increases with distance from the projector 9.

That is, as shown in FIG. 7, the projected light PL (PL1) is incident on an angle changing portion 63 formed in a position close to the reference point SP2 (angle changing portion 63 close to light exiting position PP) at an angle of incidence $\theta 2$ smaller than the angle of incidence $\theta 2$ of the projected light PL incident on an angle changing portion 63 in the vicinity of the center shown in FIG. 8. In view of the fact described above, to make the angle of incidence of the projected light PL1 incident on the front surface 21 greater than the angle of incidence $\theta 2$ by refracting the projected light PL1 at the second surface 632, the inclination angle $\theta 1$ of the second surface 632 shown in FIG. 7 is set to be greater than the inclination angle $\theta 1$ of the second surface 632 of an angle changing portion 63 in the vicinity of the center of the substrate 6.

In FIG. 7, the projected light PL incident on the front surface 21 via the angle changing portions 63, reflected off one of the effective reflection regions AR described above, and incident on the second surface 632 (projected light PL2) exits upward through the first surface 631 toward the viewing position VP described above, as indicated by the dashed line.

On the other hand, the projected light PL1 is incident on an angle changing portion 63 formed in a position far away from the reference point SP2 (angle changing portion 63 far away from light exiting position PP) at an angle of incidence $\theta 2$ greater than the angle of incidence of the projected light PL incident on an angle changing portion 63 in the vicinity of the center, as shown in FIG. 9. To make the angle of incidence of the projected light PL1 incident on the front surface 21 greater than the angle of incidence $\theta 2$ by refracting the projected light PL1 at the second surface 632, the inclination angle $\theta 1$ of the second surface 632 shown in FIG. 9 is set to be smaller than the inclination angle $\theta 1$ of the second surface 632 of an angle changing portion 63 in the vicinity of the center of the substrate 6.

In FIG. 9, the projected light PL2 incident on the front surface 21 via the angle changing portions 63, reflected off one of the effective reflection regions AR described above, and incident on the second surface 632 exits downward through the first surface 631 toward the viewing position VP, as indicated by the dashed line.

In FIG. 8, the projected light PL2 incident on the front surface 21, reflected off one of the effective reflection regions AR described above, and incident on an angle changing portion 63 in the vicinity of the center of the substrate 6 exits in a substantially horizontal direction through the first surface 631 toward the viewing position VP, as indicated by the dashed line.

Effect of Substrate

Figure 10:
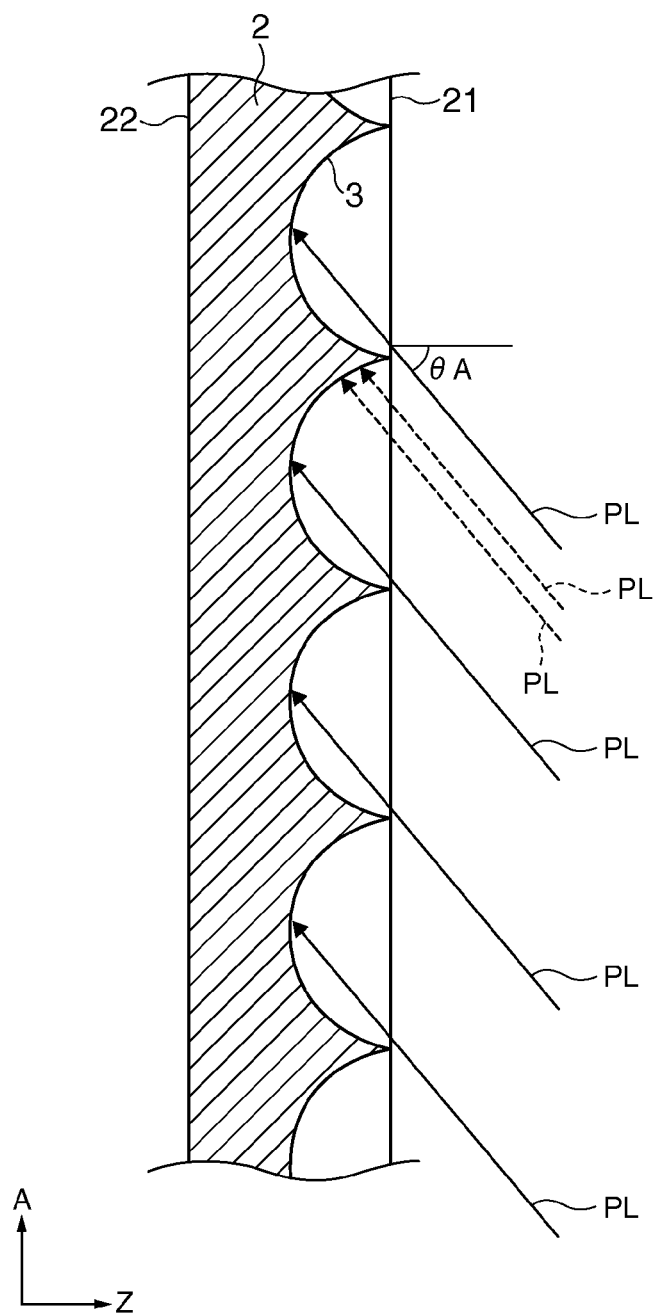
FIG. 10 describes the optical path of projected light directly incident on the screen body in the first embodiment.

FIG. 10 describes the optical path of the projected light PL traveling from the projector 9 and directly incident on the screen body 2. FIG. 10 shows the optical path of the projected light PL incident on lens elements 3 in the vicinity of the center of the screen body 2, as in FIG. 5.

When the projected light PL from the projector 9 is directly incident on the vicinity of the center of the front surface 21 of the screen body 2, the projected light PL is incident on the front surface 21 at an angle of incidence θA, as shown in FIG. 10. The angle of incidence θA is equal to the angle of incidence of the projected light PL incident on the same position on the substrate 6, that is, the angle of incidence θ2 shown in FIGS. 5 and 8.

In contrast, the projected light PL incident on the substrate 6 is refracted at the interface between the air layer from the projector 9 to the substrate 6 and the substrate 6 (first surface 631) and the interface between the substrate 6 and the air layer AL (second surface 632), as shown in FIG. 5. The second surfaces 632, through which the projected light PL exits toward the front surface 21, are inclined to the first surfaces 631 and the virtual flat plane described above, which is obtained by averaging the protrusions and recesses of the front surface 21, in such a way that the thickness of the angle changing portions 63 increases along the B direction toward its arrowed end. The optical path of the projected light PL that exits through the second surfaces 632 is made more upward than a case where no substrate 6 is present (note that the term "upward" applies to FIG. 5, more precisely, the projected light PL reaches a position farther away from the light exiting position PP), whereby the angle of incidence θ3 of the projected light PL incident on the front surface 21 is greater than the angle of incidence θ2. The change in the angle of incidence described above is caused by the angle changing portions 63.

The projected light PL incident at the angle of incidence θ3 is incident on the surface of each of the lens elements 3 (concavely curved surface) within a smaller area than in a case where the projected light PL is incident at the angle of incidence θ2. That is, a wide light flux incident on each of the first surfaces 631 exits as a narrow light flux through the rear surface 62 formed of the corresponding second surface 632 and third surface 633. Since the amount of projected light PL incident on the front surface 61 is substantially equal to the amount of projected light PL that exits through the rear surface 62 provided that loss of light at each of the interfaces is not considered, the degree of concentration of the projected light PL incident on the substrate 6 is increased as described above, and the resultant projected light PL can be incident on each of the lens elements 3.

Further, the projected light PL, which is incident on the front surface 21 at the large angle of incidence θ3, is likely to be incident on an A-direction-side region of each of the lens elements 3. The region on which the projected light PL is incident includes the effective reflection region AR described above. The amount of projected light PL incident on the effective reflection region AR can therefore be greater than in a case where no substrate 6 is provided, whereby the brightness of an image displayed on the screen 1A can be increased.

Period of Angle Changing Portions

As described above, the angle changing portions 63 are formed along the reference lines SL2, have substantially concentric perfect circular shapes, and are arranged along the B direction.

In the present embodiment, the period at which the angle changing portions 63 are arranged in the B direction differs from the period at which the lens elements 3 are arranged in the A direction. Further, the dimension of each of the angle changing portions 63 in the B direction is set not to be equal to the dimension of the lens element 3 in the A direction on which the light having exited through the angle changing portion 63 is incident. In detail, the dimension of each of the lens elements 3 in the A direction is set not to be equal to an integral multiple of the dimension of the angle changing portion 63 in the B direction through which light exits toward the lens element 3.

The reason for the configuration described above is as follows.

Among the light rays incident on the first surface 631 of each of the angle changing portions 63, light rays that pass through the angle changing portion 63 and reach the second surface 632 thereof exits through the second surface 632 and impinges on the front surface 21 at an angle of incidence greater than the angle of incidence of the light incident on the first surface 631, as described above.

On the other hand, light rays having passed through the angle changing portion 63 and reached the third surface 633 thereof are totally reflected off the third surface 633 toward the second surface 632 or refracted at the third surface 633 and exits therethrough. These light rays are unlikely to be incident on the effective reflection regions AR described above.

In a case where the position of the reference point SP1 coincides with the position of the reference point SP2 with the screen 1A viewed from the front, and when the period at which the angle changing portions 63 are arranged in the B direction is equal to the period at which the lens elements 3 are arranged in the A direction and the dimension of each of the lens elements 3 in the A direction is equal to an integral multiple of the dimension of the angle changing portion 63 in the B direction through which light exits toward the lens element 3, the projected light PL through the third surfaces 633 are disadvantageously incident on fixed portions of the lens elements. When the fixed portions are within the effective reflection regions AR, the amount of projected light PL reflected toward the viewing position VP decreases, resulting in decrease in brightness of a displayed image and possible brightness unevenness in the displayed image.

In contrast, in the present embodiment, the period at which the angle changing portions 63 are arranged in the B direction is set not to be equal to the period at which the lens elements 3 are arranged in the A direction, and the dimension of each of the lens elements 3 in the A direction is set not to be equal to an integral multiple of the dimension of the corresponding angle changing portion 63 in the B direction.

As a result, even when the position of the reference point SP1 coincides with the position of the reference point SP2 with the screen 1A viewed from the front, light rays through the third surfaces 633 can be incident on various portions of the lens elements 3 arranged in the A direction, whereby the decrease in brightness of a displayed image and the brightness unevenness in the displayed image described above due to the projected light PL incident through the third surfaces 633 can be reduced.

Projected Light from Projector

The projected light PL projected from the projector 9 is circularly polarized as described above. The reason for this follows.

Consider a case where the projected light PL is formed of the color light fluxes described above and one of the color light fluxes is S polarized light and the other color light fluxes are P polarized light. Under the condition described above, when the projected light PL is incident on angle changing portions 63 on the right and left sides of a lower portion of the substrate 6 (angle changing portions 63 whose second surfaces 632 are greatly inclined and on which the projected light PL is incident approximately horizontally), the amount of loss of the light passing through these angle changing portions 63 differs between the S polarized light and the P polarized light. As a result, an image displayed on the screen 1A suffers from color unevenness.

On the other hand, when the color light fluxes are polarized in the same direction, the light fluxes incident on the same angle changing portion 63 will be attenuated by the same amount, whereby color unevenness will not occur. In this case, however, how efficiently the light is reflected off the screen 1A depends on the position on the screen 1A where the light is incident, resulting in brightness unevenness across a displayed image.

In contrast, when the projected light PL is circularly polarized, the loss of light described above is unlikely to occur, whereby a displayed image will not suffer from the color unevenness or the brightness unevenness described above.

The screen 1A according to the present embodiment described above provides the following advantageous effects.

That is, the substrate 6 is disposed on the front side of the screen body 2 with the air layer AL therebetween, and the plurality of angle changing portions 63, whose thickness continuously increases with distance from the light exiting position PP (position that coincides with reference point SP2 when screen 1A is viewed from front), are formed in the substrate 6. In each of the angle changing portions 63, the second surface 632 located on the side where the screen body 2 is present is inclined to the first surface 631 located on the side where the light exiting position PP is present. The configuration described above allows the projected light PL to be incident on the front surface 21 of the screen body 2 (projected light PL1) at a greater angle of incidence and hence the degree of concentration of the projected light PL1 to be higher than in a case where no substrate 6 or air layer AL is present, whereby the amount of light incident on the effective reflection regions AR of the lens elements 3 can be increased and hence the brightness of a displayed image can be improved.

Since the angle changing portions 63, each of which has a substantially regular trapezoidal cross-sectional shape, are arranged along the B direction, the rear surface 62 has a sawtooth cross-sectional shape. The thickness of the substrate 6 can therefore be smaller than in a case where the substrate 6 is formed only of a single angle changing portion 63, whereby the screen 1A will not be unnecessarily thick.

Since the angle changing portions 63 are so formed that they follow the arcuate reference lines SL2, which partially form substantially concentric perfect circles around the reference point SP2, the angle changing portions 63 have substantially concentric perfect circular shapes. Further, the angle changing portions 63 are arranged in the B direction, which is the radial direction from the reference point SP2. A light ray having exited from the light exiting position PP is therefore incident perpendicularly on the tangential line of the arc of the angle changing portion 63 on which the light ray is incident. In this case, the above-mentioned angle of incidence of the light incident on the front surface 21, over which the lens elements 3 are formed, can be maximized, whereby the amount of light incident on the effective reflection regions AR can be reliably increased and the brightness of a displayed image can further be improved.

Further, the lens elements 3 are arranged along the plurality of arcuate reference lines SL1 around the reference point SP1. The configuration allows light to be more readily incident on the effective reflection regions AR of the lens elements 3 than in a case where the screen body has a plurality of lens elements arranged along linear reference lines parallel to one another, whereby the brightness of a displayed image can be improved.

The period at which the angle changing portions 63 are arranged in the B direction differs from the period at which the lens elements 3 are arranged in the A direction, and the dimension of each of the lens elements 3 in the A direction is not equal to an integral multiple of the dimension of the corresponding angle changing portion 63 in the B direction. The configuration described above allows light rays through the third surfaces 633 to be incident on various portions of the lens elements 3 even when the position of the reference point SP1 coincides with the position of the reference point SP2 with the screen 1A viewed from the front, whereby the light reflected off the entire screen 1A is made uniform. The brightness unevenness described above can therefore be suppressed.

Since an antireflection layer is formed on each of the front surface 61 and the rear surface 62, the amount of light incident on the surfaces 61 and 62 can be increased, whereby the brightness of a displayed image can further be improved. In addition, since substantially no external light will be reflected off the front surface 61 toward the viewing position, the contrast of a displayed image can be improved.

Since the front surface 61 formed of the first surfaces 631 is flat, it is readily possible to point the front surface 61 with a pointing stick and write, for example, characters on the front surface 61, whereby the versatility of the screen 1A can be improved.

Second Embodiment

A second embodiment of the invention will next be described.

A screen according to the present embodiment has the same configuration as that of the screen 1A described above. Each of the angle changing portions 63 of the screen 1A is so configured that the second surface 632 is inclined to the front surface 21. In contrast, in the screen according to the present embodiment, a first surface of each angle changing portion is inclined to the front surface 21. The screen according to the present embodiment differs from the screen 1A in this regard. In the following description, the same or substantially the same portions as those having been described have the same reference characters, and no description thereof will be made.

Figure 11:
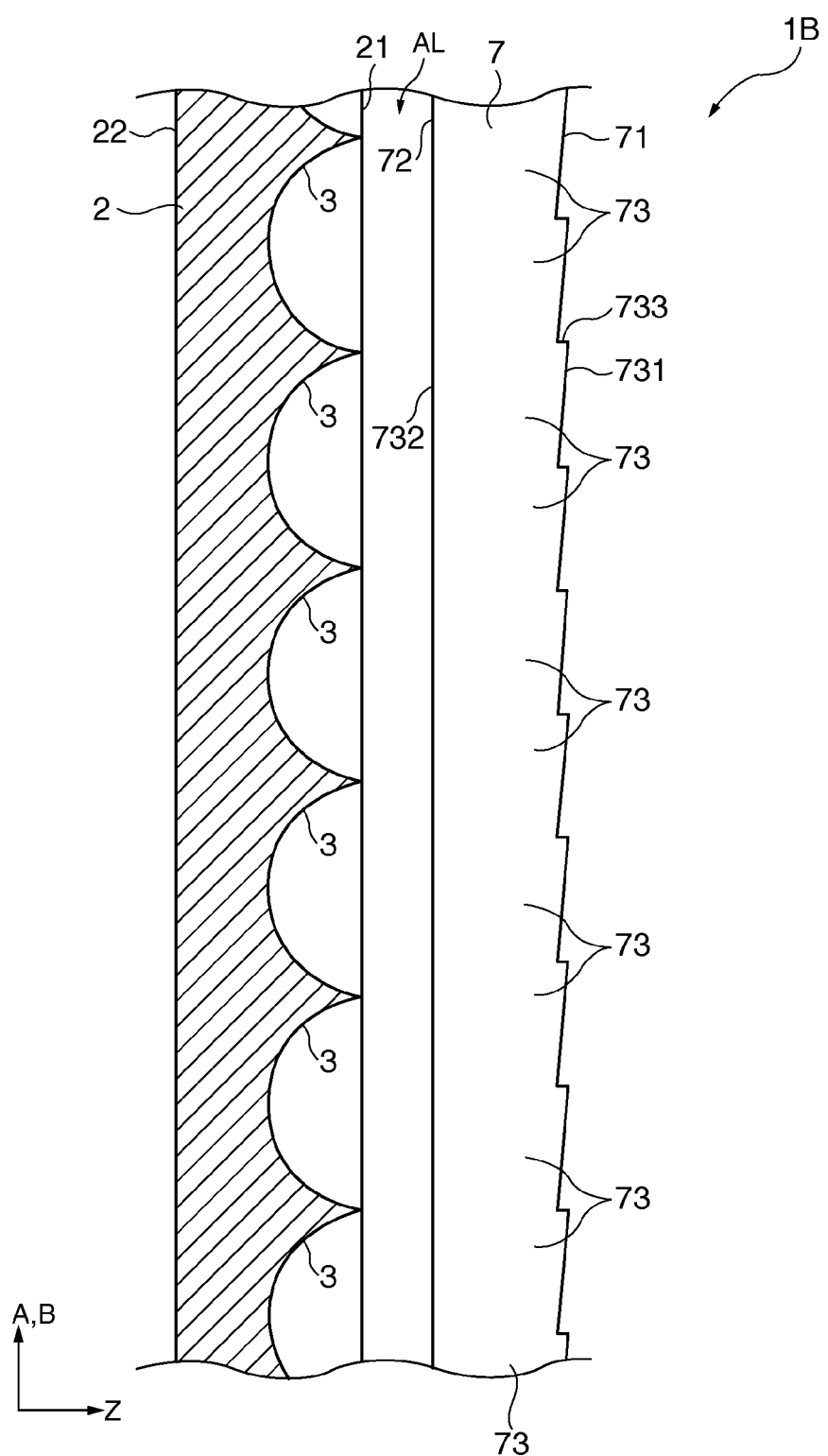
FIG. 11 is a cross-sectional view showing a screen according to a second embodiment of the invention.

FIG. 11 is a cross-sectional view showing a screen 1B according to the present embodiment. In detail, FIG. 11 is a cross-sectional view of a portion in the vicinity of the center of the screen 1B taken along a plane including the A and B directions and the Z direction. In FIG. 11, each lens element 3 is schematically drawn in the form of a semicircle.

The screen 1B according to the present embodiment has substantially the same configuration as that of the screen 1A described above except that the substrate 6 is replaced with a substrate 7, as shown in FIG. 11.

The substrate 7 corresponds to the first layer in the appended claims and is so disposed that the air layer AL corresponding to the second layer in the appended claims is sandwiched between the substrate 7 and the front surface 21 of the screen body 2. The substrate 7 has the same configuration as that of the substrate 6 and has a shape obtained by reversing the front surface 61 and the rear surface 62 of the substrate 6.

Specifically, the substrate 7 has not only a front surface 71 and a rear surface 72 but also a plurality of angle changing portions 73 formed along reference lines SL2 that partially form substantially concentric perfect circles around a reference point SP2 (not shown) set in an extension plane of the front surface 71. The angle changing portions 73 are arranged in a B direction, which is the radial direction from the reference point SP2, and each of the angle changing portions 73 has a substantially regular trapezoidal cross-sectional shape taken along a plane including the B and Z directions. In the present embodiment, the position of the reference point SP2 coincides with the position of the reference point SP1 and the light exiting position PP when the screen 1B is viewed from the front.

A second surface 732, which is a rear surface of each of the angle changing portions 73 and forms one side perpendicular to the two sides of the regular trapezoidal shape that are parallel to each other, forms the rear surface 72, which is a flat surface parallel to the front surface 21.

Further, a first surface 731, which is a front surface of each of the angle changing portions 73 and forms the opposite side of the one side of the regular trapezoidal shape, is a flat surface inclined to a surface parallel to the second surface 732 by an inclination angle θ1. Each of the angle changing portions 73 is therefore so formed that the thickness thereof increases with distance from the light exiting position PP.

Further, a third surface 733, which extends along a plane connecting the ends of the first surface 731 and the second surface 732 that face away from the reference point SP2 and the light exiting position PP, connects the first surfaces 731 of angle changing portions 73 adjacent to each other in the B direction on the front side of the substrate 7. The third surfaces 733 and the first surfaces 731 form the front surface 71 having a sawtooth cross-sectional shape taken along a plane including the B and Z directions.

Although not shown, in the substrate 7, the inclination angle θ1 of each of the first surfaces 731 is set in accordance with the position where the angle changing portion 73 having the front surface 71 is formed, specifically, the inclination angle θ1 is set to decrease with distance from the light exiting position PP, as in the substrate 6.

Further, the period at which the angle changing portions 73 are arranged in the B direction is set to be different from the period at which the lens elements 3 are arranged in the A direction, and the dimension of each of the lens elements 3 in the A direction is set not to be equal to an integral multiple of the dimension of the corresponding angle changing portion 73 in the B direction.

Further, the antireflection layer described above is formed on each of the front surface 71 and the rear surface 72.

The screen 1B including the thus configured substrate 7 provides the same advantageous effects as those provided by the screen 1A described above.

Third Embodiment

A third embodiment of the invention will next be described.

A screen according to the present embodiment has the same configuration as those of the screens 1A and 1B described above. In the screen 1A, the rear surface 62 has a sawtooth cross-sectional shape, whereas in the screen 1B, the front surface 71 has a sawtooth cross-sectional shape. In contrast, in the screen according to the present embodiment, each of the front and rear surfaces of a substrate has a sawtooth cross-sectional shape. The screen according to the present embodiment differs from the screens 1A and 1B in this regard. In the following description, the same or substantially the same portions as those having been described have the same reference characters, and no description thereof will be made.

Figure 12:
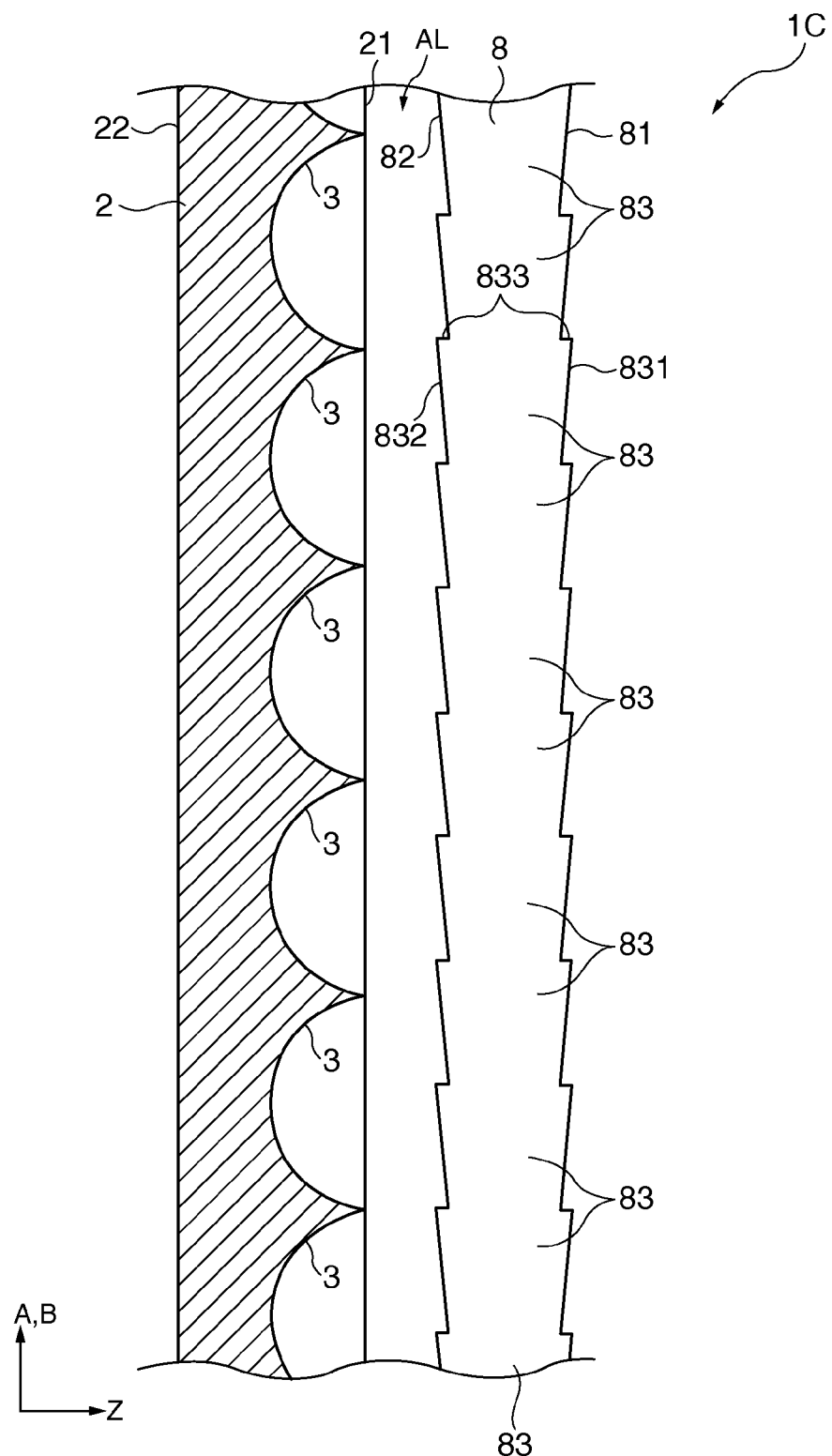
FIG. 12 is a cross-sectional view showing a screen according to a third embodiment of the invention.

FIG. 12 is a cross-sectional view showing a screen 1C according to the present embodiment. In detail, FIG. 12 is a cross-sectional view of a portion in the vicinity of the center of the screen 1C taken along a plane including the A and B directions and the Z direction. In FIG. 12, each lens element 3 is schematically drawn in the form of a semicircle.

The screen 1C according to the present embodiment has substantially the same configuration as that of the screen 1A described above except that the substrate 6 is replaced with a substrate 8, as shown in FIG. 12.

The substrate 8 corresponds to the first layer in the appended claims and is disposed on the side of the front surface 21 of the screen body 2 where the light exiting position PP is present with the air layer AL corresponding to the second layer in the appended claims interposed between the substrate 8 and the screen body 2. The substrate 8 has a plurality of angle changing portions 83 each having a substantially trapezoidal cross-sectional shape and formed along a plurality of arcuate reference lines SL2 that partially form substantially concentric perfect circles around a reference point SP2 set in an extension plane of a rear surface 82 of the substrate 8.

The angle changing portions 83 are arranged in a B direction, and each of the angle changing portions 83 is so formed that the thickness thereof continuously increases with distance from the light exiting position PP. The position of the reference point SP2 coincides with the position of the reference point SP1 and the light exiting position PP when the screen 1C is viewed from the front in the present embodiment as well.

A first surface 831 and a third surface 833 on the front side of each of the angle changing portions 83 form a front surface 81 of the substrate 8, and a second surface 832 and a third surface 833 on the rear side of each of the angle changing portions 83 form the rear surface 82 of the substrate 8. Each of the front surface 81 and the rear surface 82 has a sawtooth cross-sectional shape taken along a plane including the B and Z directions.

The inclination angles of the first surface 831 and the second surface 832 of each of the thus configured angle changing portions 83 to the front surface 21 (virtual flat plane obtained by averaging protrusions and recesses of front surface 21 in more detail) are set as appropriate, provided that the inclination angles decrease with distance from the reference point SP2 to the position where the angle changing portion 83 is formed, as in the substrates 6 and 7 described above.

Further, the period at which the angle changing portions 83 are arranged in the B direction is set to be different from the period at which the lens elements 3 are arranged in the A direction, and the dimension of each of the lens elements 3 in the A direction is set not to be equal to an integral multiple of the dimension of the corresponding angle changing portion 83 in the B direction.

Moreover, the antireflection layer described above is formed on each of the front surface 81 and the rear surface 82.

The screen 1C including the thus configured substrate 8 provides the same advantageous effects as those provided by the screen 1A described above.

Variations of Embodiments

The invention is not limited to the embodiments described above, and variations, modifications, and other changes fall within the scope of the invention to the extent that they achieve the advantages of the invention.

The inclination angle θ1 of the first and second surfaces of each of the angle changing portions shown in the embodiments described above can be changed as appropriate based on the position where the projector 9 is installed and other factors.

In the embodiments described above, the air layer AL as the second layer is interposed between any of the substrates 6 to 8 and the screen body 2, but the invention is not necessarily configured this way. That is, the space between any of the substrates 6 to 8 and the screen body 2 may be filled with a material having a refractive index smaller than those of the substrates 6 to 8 as the first layer. For example, the material may be an adhesive used to bond the substrates 6 to 8 to the screen body 2.

In the embodiments described above, the dimension of each of the lens elements 3 in the A direction is set not to be equal to an integral multiple of the dimension of the corresponding angle changing portion 63, 73, or 83 in the B direction. For example, the dimension of each of the angle changing portions in the B direction may alternatively be set at a random value. That is, the dimensions of the lens elements 3 and the angle changing portions in the A direction and the B direction can be set as appropriate as long as light rays having exited through the third surfaces of the angle changing portions can be incident on various portions of the lens elements.

Each of the above embodiments has been described with reference to a projector including a light modulator having three liquid crystal panels, but the invention is not necessarily configured this way. The invention is also applicable to a projector including a light modulator having one or two liquid crystal panels and a projector including a light modulator having four or more liquid crystal panels. Further, a light modulator having another configuration may be used as long as the light modulator modulates an incident light flux in accordance with image information to form an optical image. For example, a projector using a micromirror-based device or any other light modulator that does not use a liquid crystal material may also be used.

In the embodiments described above, the lens elements 3 are arranged along arcuate lines around the reference point SP1 set in the extension plane 22 of the front surface 21, but the invention is not necessarily configured this way. For example, the reference point SP1 may be set on the front surface 21. Further, the lens element 3 or the angle changing portions 63, 73, or 83 are not necessarily arranged or formed along the arcuate reference lines SL1 or SL2. For example, the lens element and the angle changing portions may be arranged and formed along a plurality of linear reference lines parallel to one another.

In the embodiments described above, an antireflection layer is formed on each of the front surfaces 61, 71, and 81 and the rear surfaces 62, 72, and 82 of the substrates 6 to 8, but the invention is not necessarily configured this way. That is, an antireflection layer may be formed on either the front or rear surface, or no antireflection layer may be formed at all.

In the embodiments described above, the reference point SP2 as the first reference point, the reference point SP1 as the second reference point, and the light exiting position PP coincide with one another when the screens 1A to 1C are viewed from the front, but the invention is not necessarily configured this way. That is, all the reference point SP1, the reference point SP2, and the light exiting position PP may not necessarily coincide with one another, but the light exiting position PP may coincide only with either the reference point SP1 or SP2. It is noted that the angle changing portions, when the reference point thereof coincides with the light exiting position with the screen viewed from the front, can maximize the angle of incidence of projected light incident on the front surface of the screen body. In this case, the reference point of the lens elements does not necessarily coincide with the light exiting position.

In the embodiments described above, the reference points SP2 of the angle changing portions 63, 73, and 83 are set in the extension plane 61A of the front surface 61, the extension plane of the front surface 71, and the extension plane of the rear surface 82 respectively, but the invention is not necessarily configured this way. For example, another virtual flat plane passing through the center of the substrate in the thickness direction and extending along a virtual flat plane obtained by averaging the protrusions and recesses of the front or rear surface of the substrate may be defined, and a reference point of the angle changing portions may be set in the thus defined virtual flat plane.

The invention is preferably applicable to a reflective screen on which an image is projected.

The entire disclosure of Japanese Patent Application No. 2011-143026, filed Jun. 28, 2011 is expressly incorporated by reference herein.

What is claimed is:

1. A screen on which an image according to light incident in an oblique direction from a predetermined light exiting position is displayed, the screen comprising:
    a screen body having a reflection surface with a plurality of lens elements formed thereon, each of the lens elements reflecting the light incident thereon;
    a first layer disposed on the side of the reflection surface on which the light is incident; and
    a second layer interposed between the screen body and the first layer, wherein the first layer has a refractive index greater than the refractive index of the second layer, and
    the first layer has an angle changing portion formed in at least part of a region through which the light incident thereon passes, the angle changing portion so formed that the thickness thereof continuously increases with distance from the light exiting position,
    wherein the angle changing portion has:
        a flat first surface located on the light exiting position side,
        a flat second surface located on the screen body side, and
        a third surface that extends along a plane connecting the ends of the first surface and the second surface that face away from the light exiting position,
    the first layer has a configuration in which the angle changing portion is formed as a single unit shape at a plurality of locations,
    the first surfaces of the angle changing portions form a surface of the first layer on the light exiting position side, and
    the second surfaces of the angle changing portions form a surface of the first layer on the screen body side.

2. The screen according to claim 1,
    wherein the angle changing portions have concentric perfect circular shapes around a first reference point set on a front surface of the first layer, a rear surface of the first layer, or an extension plane of the front or rear surface and are arranged along a radial direction from the first reference point.

3. The screen according to claim 2,
    wherein the lens elements are arranged along substantially arcuate reference lines around a second reference point set on the reflection surface or an extension plane of the reflection surface.

4. The screen according to claim 3,
    wherein the period at which the angle changing portions are arranged differs from the period at which the lens elements are arranged, and
    the dimension of each of the lens elements in a radial direction from the second reference point is not equal to an integral multiple of the dimension of the angle changing portion corresponding to the lens element in the radial direction from the first reference point.

5. The screen according to claim 1, wherein the surface of the first layer on the light exiting position side or the surface of the first layer on the screen body side has an antireflection layer.

6. The screen according to claim 1, wherein the surface of the first layer on the light exiting position side is a flat surface.

7. The screen according to claim 1, wherein an inclination angle between the flat second surface and a plane parallel to the flat first surface is set in accordance with the position where the angle changing portion is formed.

8. The screen according to claim 7, wherein the inclination angle decreases with distance from the light exiting position.

9. The screen according to claim 1, wherein a distance between centers of the lens elements increase with distance from the light exiting position.

10. The screen according to claim 1, wherein dimensions of the lens elements increase with distance from the light exiting position.

\* \* \* \* \*